United States Patent
Pless

(10) Patent No.: US 7,821,642 B2
(45) Date of Patent: Oct. 26, 2010

(54) METHOD AND SYSTEM OF DEVICE IDENTIFICATION

(75) Inventor: Benjamin D. Pless, Atherton, CA (US)

(73) Assignee: NeuroPace, Inc., Mountain View, CA (US)

(*) Notice: Subject to any disclaimer, the term of this patent is extended or adjusted under 35 U.S.C. 154(b) by 0 days.

(21) Appl. No.: 12/626,417

(22) Filed: Nov. 25, 2009

(65) Prior Publication Data

US 2010/0073677 A1    Mar. 25, 2010

Related U.S. Application Data

(62) Division of application No. 11/556,357, filed on Nov. 3, 2006, now Pat. No. 7,643,147.

(51) Int. Cl.
*G01B 9/02* (2006.01)
(52) U.S. Cl. .................................... 356/450
(58) Field of Classification Search ............. 356/450, 356/511–512
See application file for complete search history.

(56) References Cited

U.S. PATENT DOCUMENTS

| | | | |
|---|---|---|---|
| 5,673,473 A * | 10/1997 | Johnson et al. ............ 29/592.1 |
| 6,137,570 A | 10/2000 | Chuang et al. |
| 6,741,360 B2 | 5/2004 | D'Agraives et al. |
| 7,168,142 B2 * | 1/2007 | Nowaczyk ................... 29/90.7 |
| 2004/0085541 A1 | 5/2004 | Goernemann |
| 2005/0036135 A1 | 2/2005 | Earthman et al. |
| 2006/0104103 A1 * | 5/2006 | Colineau et al. .............. 365/71 |

OTHER PUBLICATIONS

Nonfinal Office action mailed Jul. 23, 2010 in respect of copending U.S. Appl. No. 12/626,577, which is a continuation of U.S. Appl. No. 11/556,357, the application to which the instant application (U.S. Appl. No. 12/626,417) asserts priority.

* cited by examiner

*Primary Examiner*—Michael A Lyons

(57) ABSTRACT

A medical device susceptible to identification using interference patterns for performing device identification is disclosed. A source signal may be directed from an energy source towards the surface of a device for reflection therefrom. An interference pattern may be detected from the surface of the device, such as by a sensor. A determination as to whether a match exists between the representation of the interference pattern and a stored representation of an interference pattern may be performed. If a match exists, the device may be identified based on the stored representation of the interference pattern. Otherwise, a representation of the interference pattern may be stored and a unique identifier may be assigned to the stored representation of the interference pattern.

4 Claims, 3 Drawing Sheets

METHOD AND SYSTEM OF DEVICE IDENTIFICATION

CROSS-REFERENCE TO RELATED APPLICATIONS

This is a divisional of U.S. patent application Ser. No. 11/556,357, filed Nov. 3, 2006, which is incorporated by reference in the entirety herein.

Not Applicable

BACKGROUND

1. Technical Field

The disclosed embodiments pertain to methods and systems for identifying devices. The disclosed embodiments particularly pertain to methods and systems for identifying devices using speckle patterns.

2. Background

Implantable medical devices can be used to perform a variety of functions for patients needing medical care. Such devices include relatively large devices, such as implantable defibrillators, and relatively small devices, such as bone screws and stents.

In order to provide an appropriate level of patient safety, all implanted devices, and many non-implanted devices, must be serialized to enable tracking if a part defect, product recall, concerns about counterfeit parts or other reliability issue arises. While a relatively large medical device is typically identified by a serial number that is written, engraved or otherwise labeled on the device, a smaller device is conventionally identified only on its packaging by a serial number or a lot number because such devices are too small to be directly labeled by conventional means. As such, when a small, unlabeled medical device is explanted and/or returned to a supplier without its packaging, it can be impractical or impossible to identify the manufacturing lot from which the device came and/or the serial number assigned to the device.

Adequately identifying small devices can also be problematic in other fields as well. For example, a small semiconductor device might not be sufficiently large to identify the part number, the lot number, the manufacturer and the like.

What is needed is a method and system for uniquely identifying a device, particularly a device that is difficult to directly label with a serial number.

A further need exists for a simple and inexpensive process for performing such identification for medical and non-medical devices.

The present embodiments are directed to solving one or more of the aforementioned problems.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural references unless the context clearly dictates otherwise. Thus, for example, reference to a "device" is a reference to one or more devices, parts and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

As a device is manufactured, microscopic and/or other subtle variations may occur in the device. Identifying such variations for a particular device may enable the variations to be used as an identifying feature. In an embodiment, variations may be introduced in a manufacturing process to distinguish devices from each other. Such identification may be performed with respect to distinguishing a device from other devices of the same type.

In an embodiment, an energy beam, such as a coherent light source or laser, may be directed towards a device. The device may cause the energy beam to be scattered resulting in a spatially distributed interference pattern, also known as a speckle pattern. Microscopic and/or other variations in material composition of each device may cause the scattering to differ for each device. However, the scattering may be reproducible for a particular device.

Exposing the device to an energy beam may produce a speckle pattern, which may be recorded. In an embodiment, the device may be fully rotated as part of the speckle pattern recording process. The speckle pattern for a device may be stored and may represent a unique signature or identifying label for the device.

When a device that has been distributed is returned to a supplier, the device may be identified by rescanning the device and comparing the resulting speckle pattern with one or more stored speckle patterns to determine a match. The speckle patterns may be compared using, for example, a pattern recognition process, such as a computer automated pattern recognition process. For example, the speckle pattern for the returned device may be compared with database entries of speckle patterns produced by all devices that are of the same type as the returned device. The speckle pattern for the returned device may alternately be compared with all speckle patterns of all devices sold by the supplier, produced by a particular manufacturer, or the like.

A pattern recognition process may be used to locate a matching segment and/or portions of matching segments of the speckle pattern that align. Locating matching segments and/or portions of matching segments may be particularly useful for identifying damaged and/or worn devices. In an embodiment, a recognition process may detect variations in absolute intensity of a speckle pattern.

If particular devices are partially or completely composed of a bulk material that is transparent or translucent to the energy beam, particulate matter, such as a metal oxide, may be added to the bulk material to substantially increase the variability of speckle patterns produced among devices of that type. In an embodiment, the amount of particulate matter added to the bulk material may have substantially no effect on the bulk material's mechanical or chemical properties. If a device is completely opaque, such as for a device composed of a metal, microscopic differences in surface finish may be introduced by bead blasting and/or other mechanical means if necessary to enhance the speckle pattern variability.

In an embodiment, a system for performing device identification may include an energy source configured to direct a source signal onto a device such that the source signal is reflected and/or scattered by the device resulting in an interference pattern, a sensor configured to capture an interference pattern of the reflected signal, and a computing unit configured to store the interference pattern for the device and to assign a unique identifier to the interference pattern for the device.

In an embodiment, a method of performing device identification may include directing a source signal from an energy source towards the surface of a device for reflection and/or scattering therefrom, detecting an interference pattern from the surfaces of the device, and determining whether a match exists between at least a portion of the representation of the interference pattern and at least a portion of a stored representation of an interference pattern. If a match exists, the method may further include identifying the device based on the stored representation of the interference pattern. If no match exists, the method may further include storing a representation of the interference pattern, and assigning a unique identifier to the representation of the interference pattern.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
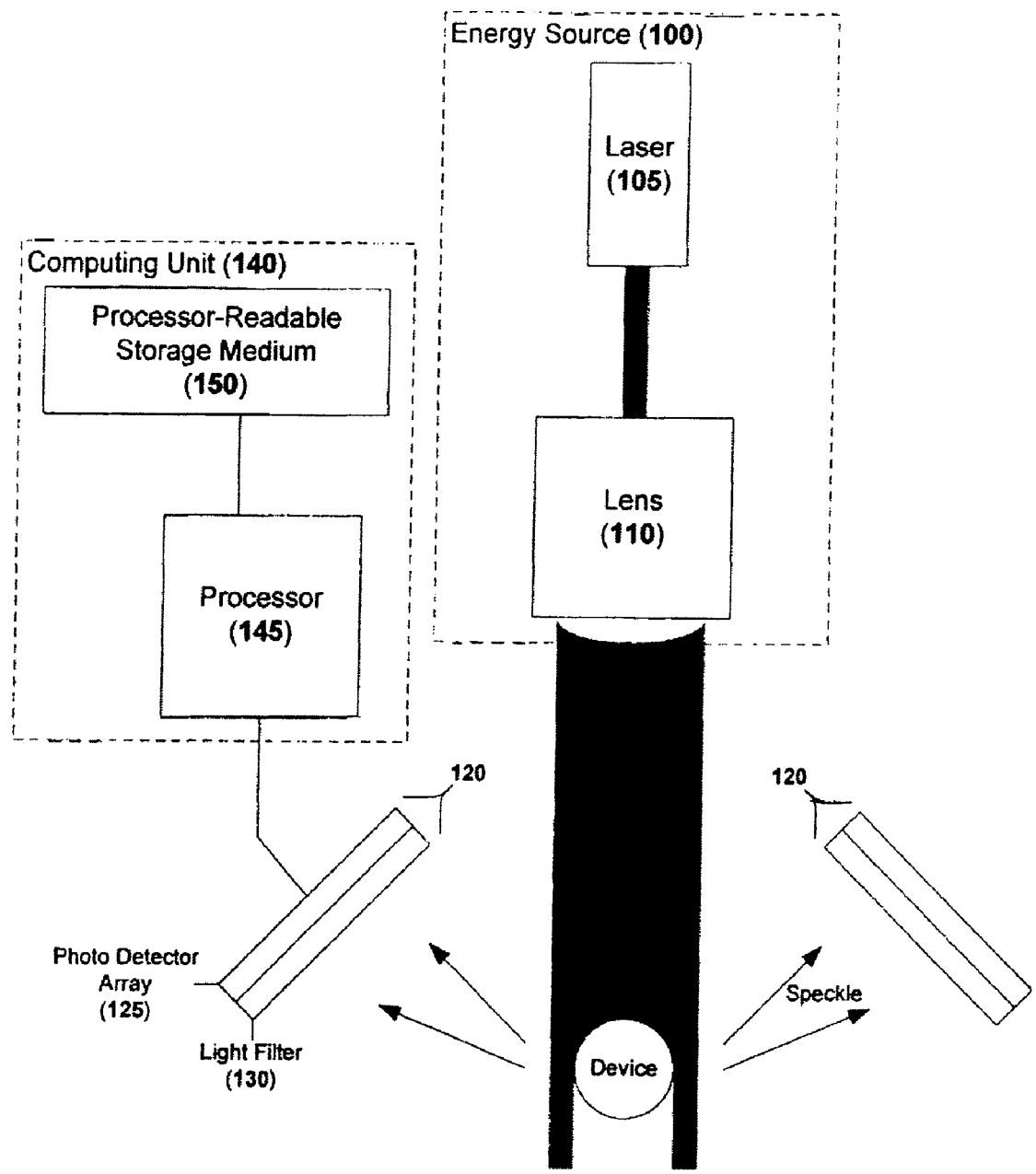
FIG. 1 depicts an exemplary scanning apparatus for determining a speckle pattern according to an embodiment.

FIG. 1 depicts an exemplary scanning apparatus for determining a speckle pattern according to an embodiment. As shown in FIG. 1, the scanning apparatus may include an energy source 100, one or more sensors 120 and a computing unit 140.

The energy source 100 may comprise a coherent energy source. The most common exemplary coherent energy source may be a coherent light source 105, such as a laser. Alternate coherent energy sources 100 may include a sound generator, an ultraviolet or infrared light generator or any other device capable of generating a coherent wave pattern. In an embodiment, a helium-neon laser having a long coherence length may be used. In an embodiment, a stabilized helium-neon laboratory laser, such as Melles Griot model 05 STP 901, may be used.

In an embodiment, the energy source 100 may include a coherent light source 105 and one or more lenses 110. In an embodiment, the one or more lenses 110 may include a dispersing and collimating lens. The one or more lenses 110 may be used to disperse and collimate the coherent light beam to form a collimated light beam that is wider than the beam emitted from the coherent light source 105. In an embodiment, the collimated light beam may be wider than a device illuminated by the collimated light beam. For example, if the laser has a beam width of 0.5 mm, a beam expander, such as the Edmund Optics 10× beam expander (model NT55-578), may be used to achieve a 5 mm beam diameter to illuminate the device being scanned.

The device to be interrogated may be mechanically fixtured to achieve a repeatable speckle pattern. In an embodiment, micron or sub-micron repeatability may be achieved with a mechanical system. For many materials, controlling the temperature at which the testing is performed may be helpful in achieving satisfactory repeatability. Rotating the entire device during the interrogation process may result in partial matches that may be adequate for uniquely identifying the device.

A sensor 120 may include a photo detector array 125. The photo detector array 125 may be a charge coupled device or other suitable imaging device. In an embodiment, a filter 130, such as a light filter, may be used to limit the energy reaching the sensor 120 to that produced by the energy source 100. In an embodiment, each filter 130 may include an interference filter that produces a narrow pass band to exclude energy having a wavelength other than that produced by the energy source 100. For example, a light filter 130 may prevent light not having a wavelength substantially similar to a light-emitting energy source 100 from passing through the light filter. For example, if a 633 nm helium-neon laser is used to illuminate the device being scanned, an interference filter 130, such as the Melles Griot model 03 FIL 218 interference filter, may be used to selectively pass only the light from the laser. The filter 130 may be placed in close proximity to the photo detector array 125. In an embodiment, a plurality of sensors 120 may be used in which each sensor includes, for example, a photo detector array 125 and a light filter 130. Other sensors 120 will be apparent to those of ordinary skill in the art based on this disclosure.

The computing unit 140 may be designed to receive data from the sensor 120 corresponding to a speckle pattern produced when a device is illuminated by an energy beam from the energy source 100. The computing unit 140 may include, for example and without limitation, a processor 145 and a processor-readable storage medium 150. The processor 145 may include a CPU for a computer system, a server or the like. In an embodiment, the processor may be remote from the processor-readable storage medium. The processor-readable storage medium 150 may include a random access memory (RAM), a read only memory (ROM), a portable medium such as compact disk, a digital video disk, a USB drive or the like, a hard disk, a remote computing device and/or the like. The computing unit 140 may be configured to store speckle patterns received from the sensor 120 and assign a unique identifier to the speckle pattern. The unique identifier may be used to identify a device that produced the speckle pattern. The computing unit 140 may be further configured to compare a received speckle pattern for a device with one or more stored speckle patterns to determine whether a match exists and to provide the unique identifier for the matching stored speckle pattern if a match exists. Providing the unique identifier may include, for example, causing the identifier to be displayed to a user.

Figure 2:
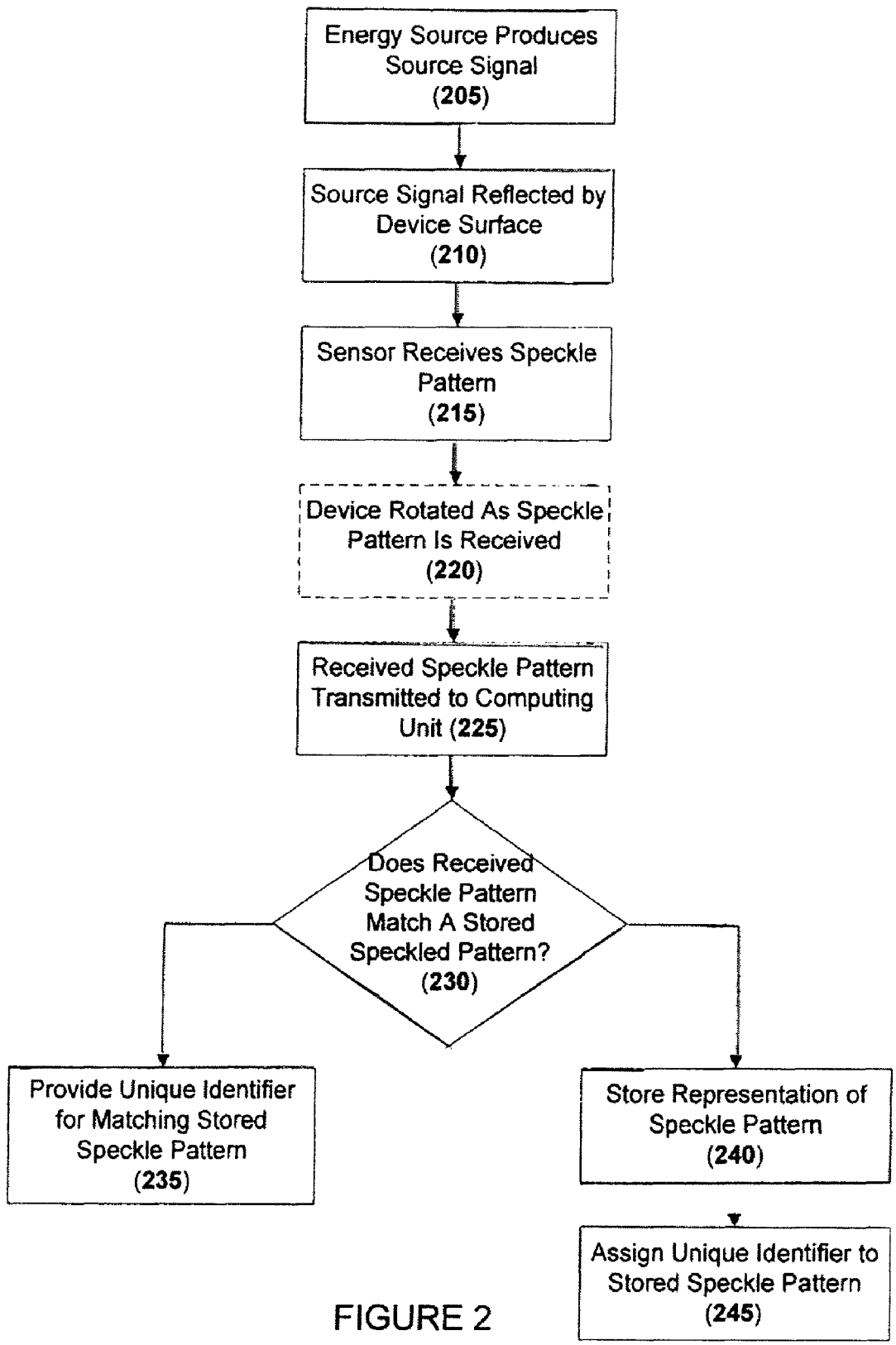
FIG. 2 depicts a flow diagram for an exemplary device identification process according to an embodiment.

FIG. 2 depicts a flow diagram for an exemplary device identification process according to an embodiment. As shown in FIG. 2, the energy source 100 may produce 205 a source signal, such as an energy beam. The device may include, for example and without limitation, a medical device, such as a stent, a pacing lead, a neurological lead, a catheter and the like, a bone screw, a miniplate, a suture sleeve, a semiconductor device or the like. The energy beam may be directed towards a device that is being identified. In an embodiment, the energy beam may be broader than the device being identified.

The energy beam may impact the surface of the device causing the energy beam to be reflected 210. As the energy beam is reflected and scattered, the interaction of the reflected energy beam may cause constructive and destructive interference patterns to occur. Such interference patterns may result in the generation of a speckle pattern.

The sensor 120 may receive 215 reflected energy in the form of a speckle pattern. For example, a photo detector array 125 may receive light energy that reflects from a device as filtered through a light filter 130. The light filter 130 may filter the received light to remove substantially all ambient light and to only permit the speckle pattern caused by the energy beam to pass. For example, the light filter 130 may filter the light of substantially all wavelengths other than a narrow range corresponding to the wavelength emitted by the energy source.

In an embodiment, the device may be, for example, fully rotated 220 (i.e., rotated 360 degrees) when capturing the speckle pattern for the device. This may improve the ability to match the speckle pattern from the device with a stored speckle pattern if the device is worn or has been damaged. In addition, rotating the device may permit identification of the device even if the device is partially misaligned. In an alternate embodiment, a static speckle pattern may be produced for devices for which accurate alignment is easily performed, such as by using a fixture.

Using a plurality of sensors 120 may improve the identification process for a device. For example, speckle patterns received by each sensor 120 may be correlated geometrically to unambiguously identify a device, even when damaged and/or worn.

The speckle pattern information received by a sensor 120 may be transmitted 225 to, for example, a computing unit 140 for post processing and storage. In an embodiment, the computing unit 140 may compare 230 a received speckle pattern for the device with one or more stored speckle patterns to determine whether a match exists. If a match does exist, the computing unit 140 may provide 235 the unique identifier for the matching stored speckle pattern. Providing 235 the unique identifier may include, for example, causing the identifier to be displayed to a user. Acceptable speckle pattern matching algorithms will be apparent to those of ordinary skill in the art and may be similar to algorithms used to perform, for example, biometric verification and/or pattern recognition. In an embodiment, a mathematical correlation between the speckle pattern for a scanned device and a stored speckle pattern may be used. In an embodiment, a match may only exist if a device has been previously scanned because each device is uniquely identified by the speckle pattern which it produces. A device may be rescanned, for example, if it had been previously distributed and was returned to the supplier due to a defect, a product recall or the like.

If a match does not exist, the computing unit may store 240 the speckle pattern or a representation of the speckle pattern and assign 245 a unique identifier to the stored speckle pattern. A representation of the speckle pattern may correspond to a mathematical computation based on the information included in the speckle pattern, a value representing a feature of one or more points within a speckle pattern or the like. The unique identifier may correspond to the stored speckle pattern and uniquely identify the device corresponding to the stored speckle pattern.

Figure 3:
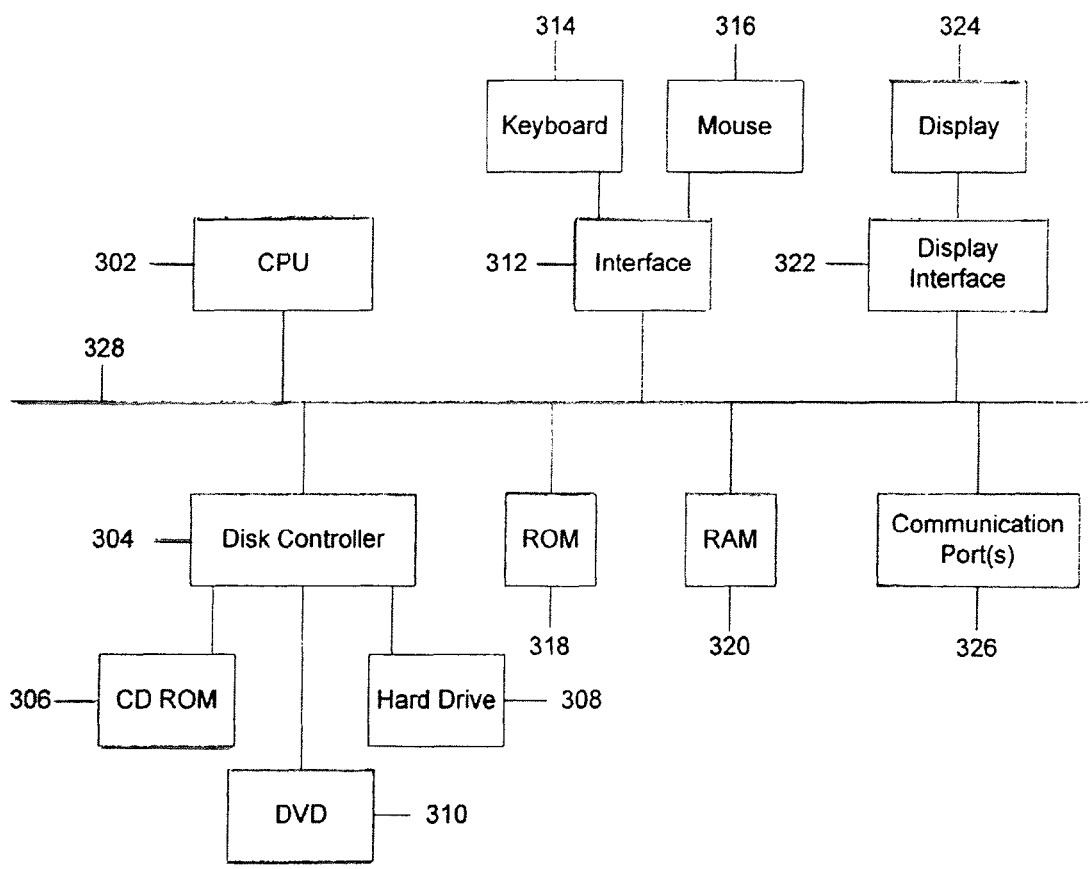
FIG. 3 is a block diagram of exemplary internal hardware that may be used to contain or implement program instructions according to an embodiment.

FIG. 3 is a block diagram of exemplary internal hardware that may be used to contain or implement program instructions according to an embodiment. Referring to FIG. 3, a bus 328 may serve as a main information highway interconnecting the other illustrated components of the hardware. CPU 302 is the central computing unit of the system, performing calculations and logic operations required to execute a program. Read only memory (ROM) 318 and random access memory (RAM) 320 constitute exemplary memory devices.

A disk controller 304 interfaces with one or more optional disk drives to the system bus 328. These disk drives may be, for example, external or internal CD ROM drives 306, hard drives 308 or DVD drives 310. As indicated previously, these various disk drives and disk controllers are optional devices.

Program instructions may be stored in the ROM 318 and/or the RAM 320. Optionally, program instructions may be stored on a computer readable medium such as a USB key or a digital disk or other recording medium, a communications signal or a carrier wave.

An optional display interface 322 may permit information from the bus 328 to be displayed on the display 324 in audio, graphic or alphanumeric format. Communication with external devices may optionally occur using various communication ports 326. An exemplary communication port 326 may be attached to a communications network, such as the Internet or an intranet.

In addition to computer-type components and their equivalents, the hardware may also include an interface 312 which allows for receipt of data from input devices such as a keyboard 314 or other input device 316 such as a remote control, pointer and/or joystick.

A multiprocessor system may optionally be used to perform one, some or all of the operations described herein. Likewise, an embedded system may optionally be used to perform one, some or all of the operations described herein.

It is to be understood that the disclosed embodiments are not limited in application to the details of construction and to the arrangements of the components or steps set forth in this description or illustrated in the drawings. The disclosed methods and systems are capable of other embodiments and of being practiced and carried out in various ways. Hence, it is to be understood that the phraseology and terminology employed herein are for the purpose of description and should not be regarded as limiting.

As such, those of ordinary skill in the art will appreciate that the conception upon which this disclosure is based may readily be utilized as a basis for the designing of other structures, methods and systems for carrying out the several purposes of the disclosed embodiments. It is important, therefore, that the claims be regarded as including such equivalent constructions insofar as they do not depart from the spirit and scope of the disclosed embodiments.

What is claimed is:

1. A medical device comprising:
   one unit of a set of units constituting a device type;
   wherein particulate matter has been introduced to and incorporated into at least one surface of the medical device to increase the variability of speckle patterns for that device type; the introduction and incorporation of the particulate matter being such that the presence of the particulate matter in the at least one surface will result in at least one unique and reproducible speckle pattern when speckle patterns of the medical device are acquired by reflecting light from a coherent light source off of the device and are compared to stored interference patterns acquired for a plurality of devices of the same device type in order to assess the probability of a match.

2. The medical device of claim 1 wherein the at least one surface further comprises a bulk material that is transparent or translucent to an energy beam used to acquire the speckle patterns and the particulate matter is a metal oxide.

3. A medical device comprising:
   one unit of a set of units constituting a device type;
   a body that is substantially opaque and at least one surface to which microscopic differences in a finish of the surface have been introduced by mechanical means to increase the variability of speckle patterns for that device type; the introduction of microscopic differences being such that the presence of the microscopic differences in the at least one surface will result in at least one unique and reproducible speckle pattern when the speckle patterns of the medical device are acquired by reflecting light from a coherent light source off of the device and are compared to stored interference patterns acquired for a plurality of devices of the same device type to assess the probability of a match.

4. The medical device of claim 3 wherein the mechanical means is bead blasting.

* * * * *